Jan. 7, 1969      S. L. SEYMOUR      3,420,652
MOLD COVER FOR BENDING GLASS SHEETS
Filed Jan. 4, 1966
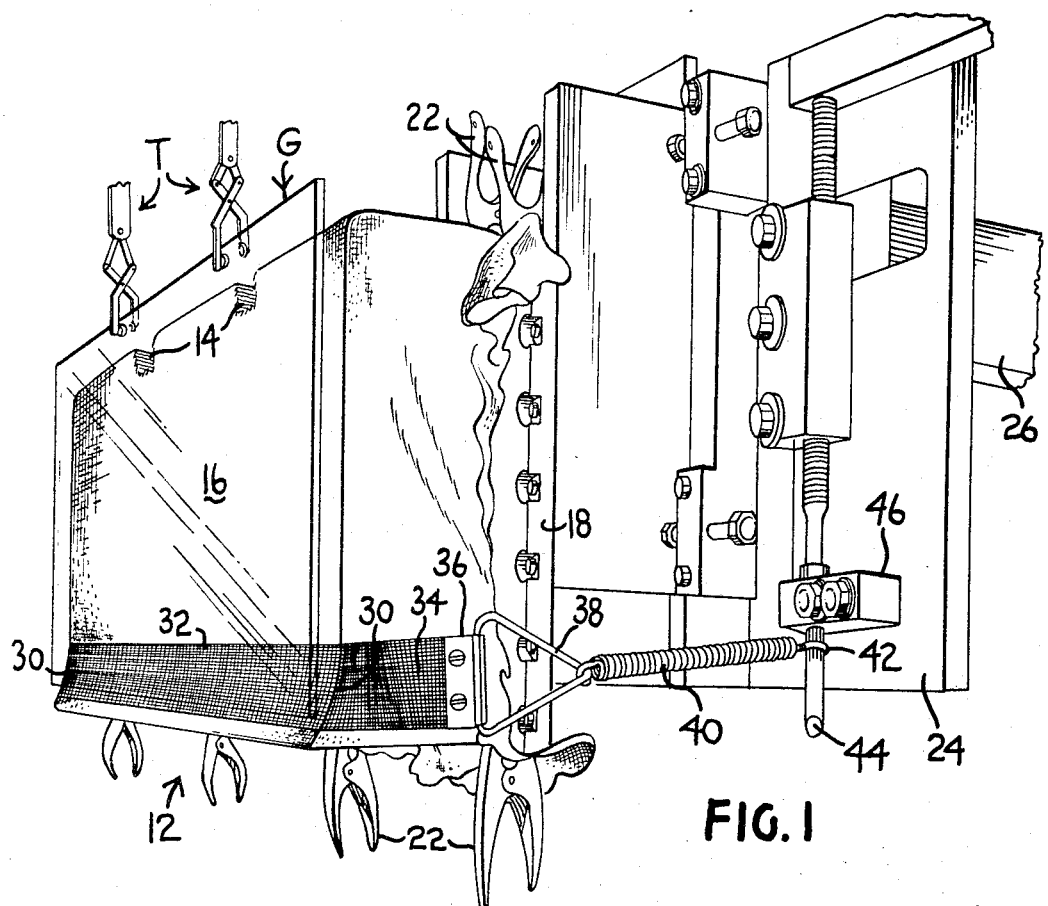
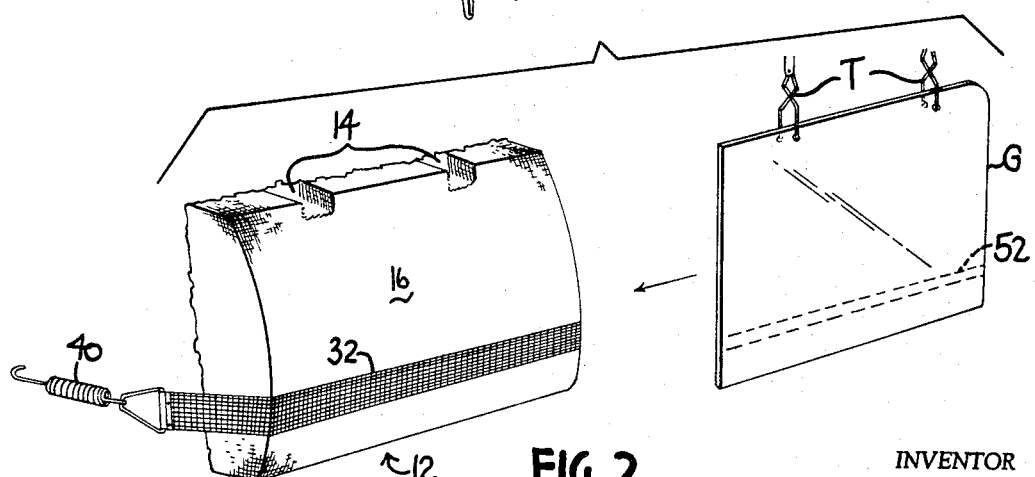
INVENTOR
SAMUEL L. SEYMOUR
BY *Chisholm & Spencer*
ATTORNEYS United States Patent Office 3,420,652
Patented Jan. 7, 1969

3,420,652
MOLD COVER FOR BENDING
GLASS SHEETS
Samuel L. Seymour, Oakmont, Pa., assignor to PPG
Industries, Inc., a corporation of Pennsylvania
Filed Jan. 4, 1966, Ser. No. 518,691
U.S. Cl. 65—287　　　　　　　　　　　　　　3 Claims
Int. Cl. C03b 23/02

ABSTRACT OF THE DISCLOSURE

An improved cover for a mold for press bending glass sheets that comprises a layer of bulky fiber glass cloth containing a fine wire screen superimposed on a portion only of said layer of bulky fiber glass cloth into which it is capable of being enveloped.

---

This invention relates to bending glass sheets, and, in particular, concerns an improved cover for a mold for shaping glass sheets by what the art calls "press bending."

In press bending, glass sheets are conveyed in sequence through a tunnel-like furnace where the glass sheets are heated to a temperature sufficiently high to deform readily when sandwiched between a pair of glass shaping members having complementary shaping surfaces conforming to the shape desired for the bent glass. When the leading sheet of a series of sheets in the furnace reaches the elevated temperature requisite for press bending, it leaves the furnace and is immediately engaged between the pair of shaping members outside the furnace exit.

The glass shaping members retract after shaping the glass and thus permit the shaped glass to leave the glass shaping station for further processing, such as sudden chilling to temper the bent glass. This retraction permits the next glass sheet in the series to move out of the furnace and into position between the retracted glass shaping members where the sandwiching step is performed on the latter sheet.

A glass shaping member is provided with a cover of a material that insulates the relatively hot glass from the relatively cold shaping surface and that does not mar the major surface of the glass when the latter is engaged in pressurized contact at an elevated temperature during its deformation. The best material known thus far for use as a cover is stretchable knit fiber glass cloth composed of textured yarn applied in unwrinkled condition over the shaping surface of the glass shaping member.

While the substitution of stretchable knit cloth for the previously used woven cloth has increased the life of the covers for press bending molds, different portions of covers are subject to different rates of wear when employed with glass shaping members having certain characteristics. The useful life of such covers is limited to their ability to resist wear and tear in their critical portion. Generally, a cover for a concave shaping surface requires more rapid replacement than a cover for a convex shaping surface. Usually, the cover for a convex shaping surface lasts two to three times as long as the cover for a concave shaping surface in a region that contacts and rubs against the heat-oftened glass sheet, particularly in a region such as the bottom edge of the glass or a relatively sharply bent portion which slides against the covers for a greater distance than the rest of the sheet as the latter is engaged by the shaping members during the shaping operation.

For purpose of definition, a portion of a layer of fiber glass used as a cover for a press bending mold that is subject to become worn or frazzled sooner than another portion of the cover is referred to as a "critical portion." The use of the term "critical portion" is not limited to the fastest wearing portion of the cover, but is also intended to encompass a portion of a cover that contacts a delicate portion of a work piece or glass sheet during its shaping. An example of a delicate portion is a frit coating or decorative stripe that is applied over a portion only of the glass before the latter is shaped.

It is a primary object of the present invention to provide improved covers for press bending molds, particularly to improve the covers in the critical portions enumerated above.

The present invention achieves this object by superimposing a fine wire screen on a critical portion only of the fiber glass layer and by providing means to tension the fine wire screen.

The present invention will be better understood in the light of a description of an illustrative embodiment of the present invention.

In the drawings which form part of the description and where like reference numbers refer to like structural elements, FIG. 1 is a fragmentary perspective view of a concave glass shaping member modified according to one embodiment of the present invention, and FIG. 2 is a fragmentary perspective view of an alternate embodiment of the present invention showing how the present invention may be employed in bending decorated glass sheets.

Referring to the drawings, FIG. 1 shows a glass sheet G gripped by tongs T between a convex glass shaping member (not shown) and a concave glass shaping member 12. Both shaping members have notches 14 to provide clearance for the tongs T when the glass shaping members engage a heat-softened glass sheet for bending. A layer 16 of fiber glass cloth covers member 12. A plate 18 is attached in spaced relation to the rear of each shaping member. Clamps 22 secure to the plate 18 the free margin of the fiber glass layer 16 in slightly stretched condition over the respective shaping surfaces of the glass shaping member 12 and the convex shaping member.

Each plate 18 is connected to the front of a piston plate 24. The rear of the latter is attached to the front end of a piston rod 26 that extends forward from a piston (not shown). For purpose of orientation the terms "front" or "forward" are used to describe a structure facing or movement toward a position occupied by glass sheet G during its shaping, and "rear," "back" or "backward" are used to describe the opposite facing or direction of movement with respect to said position as is well known in the glass bending art.

Region 30 is the most sharply bent region of the concave shaping surface of concave shaping member 12. According to the present invention, it is covered by a fine wire screen 32 extending across the most sharply bent region 30. The screen is longer than the length of the shaping surface of the glass shaping member 12 to enable the ends 34 of the screen 32 to extend rearward along the sides of the shaping member. Each end of screen 32 is fastened to a sleeve-type buckle 36 which engages the screen to a bent wire 38, shown in triangular shape with its base pivotally engaging the sleeve of the buckle 36 and its apex secured to a spring 40.

A hook 42 replaceably attaches spring 40 to a post 44. The latter is attached to a bracket 46 on piston plate 24.

Exceptionally good results were obtained from glass shaping molds having a layer of fiber glass cloth with fine wire mesh stretched across a critical portion of the glass cloth layer when the following materials were used:

(1) Knit fiberglass cloth, 28 gauge (18⅔ needles per inch), 26 stitch or courses per inch, made of fiberglass yarn 150–1/0. 1 oz. de., about 10 percent textured.

(2) 302 stainless steel wire, square weave, 120 mesh, .003 inch diameter wire.

In a production test, the number of bent glass sheets that were produced on press bending molds having the above structure before requiring replacement of the fiber glass layer was compared with the number of plates produced by press bending molds having a fiber glass cover without the wire screen applied locally over the critical portion of the fiber glass layer. Press bending molds having covers comprising both the fiber glass layer and the wire screen described above produced 462 percent more bent sheets before requiring replacement of the cover for wear than press bending molds having covers consisting of a fiber glass layer without localized wire screening.

In another production experiment depicted in FIG. 2, glass sheets G approximately 16 inches wide and 29 inches long and ¼ inch nominal thickness were provided with a decorative stripe 52 of a lead-boro-silicate enamel containing titania and zirconia as white pigmenting agents by application with a rubber squeegee through a stencil screen of 160 mesh and bent to a uniform radius of curvature of 60 inches. The sheets G were gripped by tongs T along their longest longitudinal edge and conveyed in series through a tunnel-like furnace at a constant speed for about 4 minutes. After such exposure in the furnace, each sheet in turn reached a surface temperature of about 1225 degrees Fahrenheit and was removed from the furnace into position between a pair of glass shaping members having complementary shaping surfaces. About 4 seconds elapsed in this transfer from the furnace to the position between the glass shaping members.

It took the glass shaping members about 2 seconds to complete their engagement with the opposite surfaces of the heat-softened glass sheet. The glass shaping members were held in pressurized contact of about 1 pound per square inch against the opposite surfaces of the glass for about 2 seconds and then were retracted to permit the shaped glass to move from between the shaping members to provide clearance for the entry of the next glass sheet in the series into position between the shaping members.

Using shaping members provided with the fine wire screen described above stretched with a tension pull of between 10 and 15 pounds in position to face the decorated stripe of the treated sheets, the decorated glass sheets were bent with almost imperceptible marking on the decorated stripe, insufficient to cause rejection for commercial purposes. Tensioning the wire screen avoids its wrinkling which may damage the hot glass surfaces when the shaping members engage the glass. Tensioning also reduces any tendency for the screen to wrinkle due to thermal expansion of the screen resulting from heat transfer from the hot glass to the screen. By comparison, press bending molds having a cover typical of the prior art (that is, without any wire screen on the critical portion facing the decorated region of the glass sheet) marred the decorative stripe, revealing the pattern of the fiber glass cover.

In fact it is very difficult to obtain a satisfactory press bent product having the decorative stripe without the wire screen in contact with the decorative enamel. The low maturing temperature of the decorative enamel causes it to have a low viscosity at the 1225° F. glass surface temperature required to press bend and temper the glass sheet. The low viscosity of the enamel at the 1225° F. temperatures causes it to be sticky and thus cohere with the knit fiberglass cloth during the press bending operation. The cohesion is of such magnitude to cause the press bent plate to adhere to the fiberglass cover when the press faces are retracted. As a result, the accurate press bent curvature of the plate is altered as the forward motion of the glass carrying carriages pulls and separates the plate from the fiberglass cover.

Since the enamel is a mixture of finely ground lead-boro-silicate glass and white pigmenting agents suspended in an oil base to give the mixture application consistency, it must have a maturing temperature lower than the temperature required to heat the glass plates for the bending and tempering operation. This low maturing temperature is necessary to coalesce the various non-volatile constituents of the enamel mixture into a uniform melted mixture of the desired color which will cohere firmly with the surface of the hot glass plate.

It is believed that the wire screen has a sufficiently low thermal capacity compared to that of the glass shaping member for the screen to cool relatively rapidly between successive glass shaping operations. When the shaping members contact the glass, the wire chills the surface of the decorative enamel sufficiently to harden the enamel surface and prevent the enamel from sticking to the glass cloth.

When the glass shaping members come into pressurized engagement against the opposite surfaces of the partially coated glass sheet, it is believed that the wires that cool the enamel on initial contact become embedded temporarily within the compressible fiber glass cloth layer because the thickness of the wire mesh is less than the normal compressibility of the knitted fiber glass cloth.

In order for the results desired above to take place, the wire mesh must be composed of wire strand having a diameter not more than .005" and the fiber glass cloth must be knit from textured yarn whose compressibility is greater than the wire screen thickness.

Experiments have been performed with different screen constructions to determine the range of wire strand thickness and wire cloth thickness that can be used. All glass sheets press bent on shaping members having screen materials encompassing the range of 120 x 120 to 325 x 325 square mesh weave formed of wires ranging in diameter from .0026 inch to .0014 inch and having a screen thickness ranging from .007 inch to .004 inch respectively, superimposed on critical portions of fiber glass covers produced improved results over those obtained with the same shaping members having fiberglass cloth covers without the stretched screen.

A screen having 80 x 80 square mesh formed of wire diameter of .005 inch diameter forming a mesh of .010 inch thick marked the glass when superimposed over the fiber glass cover. It is believed that screens formed of thinner wires than the range recited above are too fragile to withstand mass production. Too large a mesh (more than about 325 per inch) tends to resist deformation into the fiber glass cloth cover and tends to form wrinkles.

Textured yarns which comprise the knitted fiber glass layer are bulky or textured yarns, for example, those having texturized surfaces characteristic of those described in U.S. Patent No. 2,783,609, issued on Mar. 5, 1957, to Alvin L. Breen. Texturized yarns which exemplify the bulky or textured yarns that may be used in carrying out this invention are composed of a plurality of substantially continuous, individually convoluted filaments, as described in the aforesaid patent.

The individual filaments of texturized yarns have coils, loops or whorls at random intervals along their length. The loops comprise complete loops formed by a filament coupling back upon itself, crossing itself and then proceeding in substantially the original direction. The loops may be circular or of ring-like shape, but assume more complex shapes under pressure. The characteristics of these yarns are their bulkiness and the presence of a multitude of filament ring-like loops irregularly spaced along their surface. These filament loops contribute to bulkiness, but the less obvious convolutions of the filaments within the yarns provide lateral interfilament spacing which is important in producing bulk.

The combination of the relative thinness of the wires and the bulkiness of the one or more fiber glass layers of the novel cover permits the wires to be insulated from the shaping member by the fiber glass and cool rapidly between shaping operation. This cooling gives the wire a chance to harden the decorative stripe on initial contact that is relatively free from pressure. Thus, the combination of a fine wire screen superimposed on the critical portion only of a fiber glass cloth cover also permits ready envelopment of the wire into the bulky fiber glass cloth as pressure is increased during the press bending operation. Absence of the wire causes the bulky cloth to come into pressurized contact with the decorative stripe before the latter has a chance to harden. Thus, the decoration is liable to be marred by pressurized contact and a portion of the softened decorative material liable to be removed onto the bulky yarns forming the fiber glass cloth.

The form of the invention shown and described herein represents certain illustrative embodiments thereof. It is understood that various changes may be made such as using several layers of knit or woven glass cloth and/or screen formed of calendered wire, for example without departing from the spirit of the invention defined in the claimed subject matter which follows.

What is claimed is:

1. A cover in combination with a glass shaping member having a curved shaping surface for shaping heat-softened glass sheets by press bending, said cover comprising a layer of bulky fiber glass cloth, a fine wire screen superimposed on a portion only of said layer, said fine wire screen being composed of wire strand of a diameter less than the compressibility of said bulky cloth and capable of being enveloped in said bulky cloth, and means to tension said fine wire screen.

2. A cover as in claim 1, wherein said wire strand has a maximum diameter of .005 inch.

3. A cover as in claim 1 for use in shaping glass sheets having a portion only of their surface decorated with a decorative enamel likely to stick to said fiber glass cloth during press bending, wherein said fine wire screen is located in the portion of said cover that engages said decorated portion of said glass sheet when said glass sheet undergoes shaping by press bending.

References Cited

UNITED STATES PATENTS

| | | | |
|---|---|---|---|
| 2,608,030 | 8/1952 | Jendrisak | 65—287 UXR |
| 3,144,319 | 8/1964 | Robinson | 65—106 |
| 3,148,968 | 9/1964 | Cypher et al. | 65—106 |
| 3,346,358 | 10/1967 | Thomas | 65—106 |

DONALL H. SYLVESTER, *Primary Examiner.*

R. V. FISHER, *Assistant Examiner.*

U.S. Cl. X.R.

65—106, 24, 60, 169